(12) United States Patent
Miyazaki

(10) Patent No.: US 7,552,751 B2
(45) Date of Patent: Jun. 30, 2009

(54) PNEUMATIC TIRE WITH RIM PROTECTOR

(75) Inventor: Tetsuji Miyazaki, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 11/361,910

(22) Filed: Feb. 24, 2006

(65) Prior Publication Data

US 2007/0029023 A1 Feb. 8, 2007

(30) Foreign Application Priority Data

Aug. 2, 2005 (JP) ............................. 2005-224522

(51) Int. Cl.
- B60C 17/00 (2006.01)
- B60C 3/00 (2006.01)
- B60C 13/02 (2006.01)
- B60C 15/00 (2006.01)

(52) U.S. Cl. ..................... 152/165; 152/454; 152/516; 152/539

(58) Field of Classification Search ................. 152/523, 152/544, DIG. 9, 165, 166, 154, 513, 516, 152/522, 539, 454

See application file for complete search history.

(56) References Cited

U.S. PATENT DOCUMENTS 3,983,920 A * 10/1976 Gardner et al. .......... 152/544 X

FOREIGN PATENT DOCUMENTS

| JP | 63170110 A | * | 7/1988 |
| JP | 08258518 A | * | 10/1996 |
| JP | 2002-59712 A | | 2/2002 |
| JP | 2002059712 A | * | 2/2002 |
| JP | 2003146026 A | * | 5/2003 |

* cited by examiner

*Primary Examiner*—Adrienne C Johnstone
(74) *Attorney, Agent, or Firm*—The Webb Law Firm

(57) ABSTRACT

A pneumatic tire with a crown-shaped tread, a pair of bead portions, and a pair of side walls connecting the tread and the bead portions, wherein rim protectors which protrude outwardly in the tire rotating axial direction from the bead portions are provided at least either one of the pair of bead portions, and a plurality of protrusions are provided on a lateral side 3a outwardly in the tire radius direction of the rim protectors, and surface areas of the protrusions are not less than 50 mm$^2$ and intervals of adjacent protrusions are not greater than 160 mm.

4 Claims, 1 Drawing Sheet

PNEUMATIC TIRE WITH RIM PROTECTOR

The description of this application claims benefit of priority based on Japanese Patent Application No. 2005-224522, the entire same contents of which are incorporated by reference herein.

BACKGROUND OF THE INVENTION

1. Field of the Invention

The present invention relates to a pneumatic tire provided with a rim protector, and in more detail, the present invention relates to a pneumatic tire with protection performance of a rim secured and with durability at bead portions improved.

2. Description of the Prior Art

In a pneumatic tire with low flatness ratio, tire sectional height is low and the height to a rim of a wheel from a road surface also becomes low. Therefore, not only a sidewall portion of a tire, but also a rim gets contact with a curbstone when a tire gets contact with a curbstone, and the rim gets some damages such as scar, deformation, and the like, which sometimes causes air leakage.

In order to prevent such damages of a rim, circular protrusions (rim protectors) continuous in a tire circumferential direction and protruded outwardly in the tire width direction are provided on a portion near beads of a side wall. Even when a tire approaches a curbstone, first, said rim protector gets contact with a curbstone, and therefore, a rim is protected and damages of the rim can be prevented. For example, a pneumatic tire provided with rim protectors is publicly known in FIGS. 1 and 2, pages 1 to 2 of Japanese Patent Laid-Open Publication No. 2002-59712.

In such a conventional pneumatic tire, when the tire strongly gets contact with a curbstone, rim protectors are largely deformed subject to strong impact from the curbstone. Then the rim gets contact with the curbstone and gets damaged. In addition, satisfactory protection for rims has been made raising the protrusion height of protectors so that various kinds of flange-like rims can be protected. However, when the protrusion height of protectors is raised, since the volume of the rim protectors gets large, heating at bead portions gets large, too. As a result, a problem of degraded duration performance at bead portions has also occurred.

In the pneumatic tire of the Japanese Patent Laid-Open Publication No. 2002-59712, such a structure was made that concave portions are arranged on rim protectors with intervals, and concave portions and convex portions are alternately arranged. As a result, weight saving of protectors is attempted by decreasing the volume of the protectors due to the concave portions, however, the effect of weight saving has not been satisfactory. In addition, by providing the concave portions, although a surface area increases, heat is likely to be entrapped in the concave portions and radiation effect has not been satisfactory, either. As a result, the effect of improving durability of bead portions has been little.

Therefore, the object of the present invention is to secure the protection performance of a rim and improve the durability of bead portions.

SUMMARY OF THE INVENTION

As a result of intensive studies for solving the above problem, the inventor has completed the invention of a pneumatic tire provided with a tread with a crown shape, a pair of bead portions, and a pair of side walls connecting said tread and said bead portions, wherein rim protectors protruded outwardly in the tire rotating axial direction are provided from said bead portions are provided at least either one of said pair of bead portions, and a plurality of protrusions are provided on a lateral side outwardly in the tire radius direction of said rim protectors.

By providing protrusions on a rim protector, the same protection performance that the conventional tires used to have can be obtained. And further, rubber volume can be reduced by the portions without protrusions on a rim protector, thereby capable of reducing heating at the bead portions. As a result, durability on bead portions can be improved.

Further, the pneumatic tire of the present invention has characteristics in that intervals between said adjacent protrusions are not greater than 160 mm.

By making the intervals between the adjacent protrusions not greater than 160 mm, protection performance of a rim is further improved since when a tire gets contact with a curbstone and the like, protrusions get contact with a curbstone and the like first.

Further, the pneumatic tire of the present invention has characteristics in that a surface area of said protrusions is not less than 50 mm$^2$.

When the surface area of protrusions is not less than 50 mm$^2$, heat radiating effect due to the protrusions is large and heating at bead portions can further be suppressed, thereby improving durability at bead portions.

In addition, the pneumatic tire of the present invention has characteristics in that the height of said protrusions from a lateral side outwardly in the tire radius direction of the bead portions is not less than 11 mm, and the height of said protrusions from said rim protectors is not less than 1 mm.

Although it depends on a rim shape or on flange length, by making the height of said protrusions from a lateral side outwardly in the tire radius direction of bead portions not less than 11 mm, protection performance of a rim can be secured. Further, by making the height of said protrusions from said rim protectors not less than 1 mm, rubber volume can be reduced to a satisfactory level, thereby being capable of reducing heating at bead portions.

For information, in the present invention, rim protectors may have protrusions extending in a substantially circular manner in a tire circumferential direction which are partially interrupted, other than a series of protrusions in a tire circumferential direction.

DETAILED DESCRIPTION OF THE INVENTION

An embodiment of a pneumatic tire according to the present invention will now be explained on the basis of the drawings.

Figure 1A:
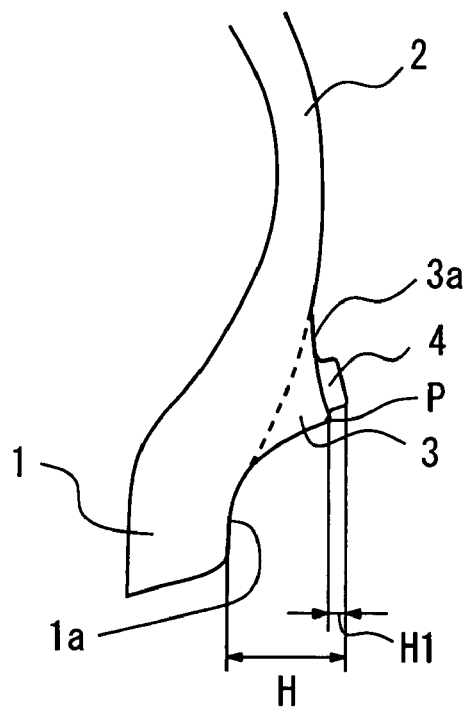
FIG. 1(a) is a cross-sectional view of a bead portion of a pneumatic tire related to the present invention.
Figure 1B:
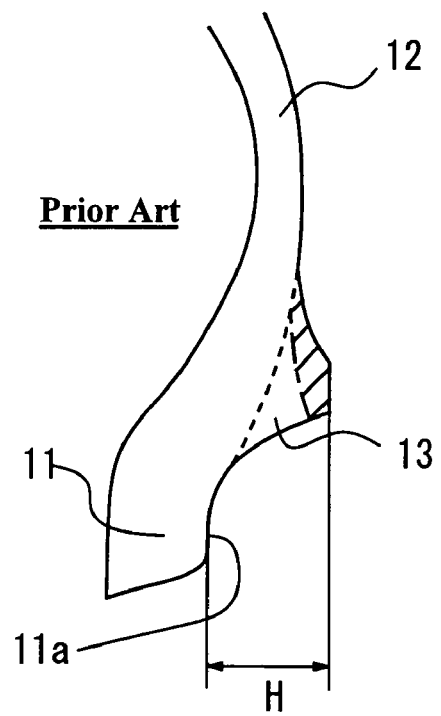
FIG. 1(b) is a cross-sectional view of a bead portion of a conventional pneumatic tire.
Figure 1C:
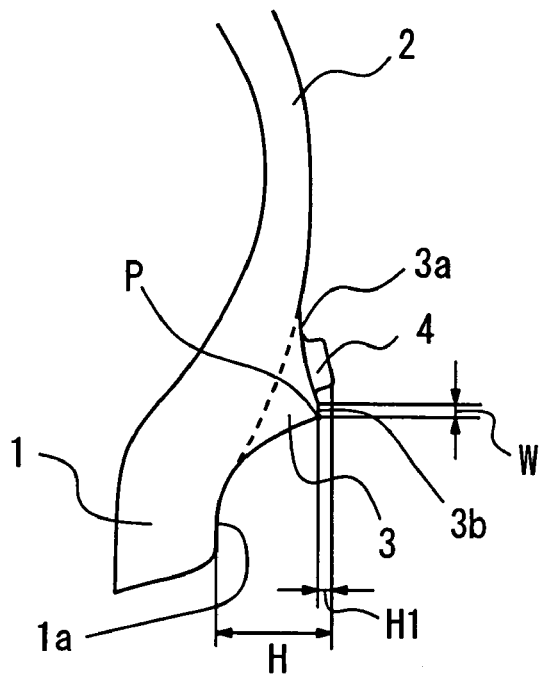
FIG. 1(c) is a cross-sectional view of a bead portion of a pneumatic tire related to the present invention.
Figure 1D:
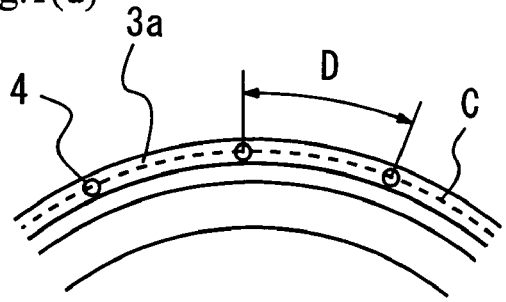
FIG. 1(d) is a fragmented side view of a tire which includes a rim protector.

FIG. 1(a) is a substantially cross-sectional view which includes bead portions of a pneumatic tire related to the present invention. In the figure, a pneumatic tire is provided with bead portions 1, a tread with a crown shape (not illustrated), and a side wall 2 connected to bead portions 1. In the bead portions 1, circular shaped rim protectors (protrusions) 3 extending in a tire circumferential direction and protruded outwardly in the tire rotating axial direction are provided. A cross-sectional shape of rim protectors 3 is triangle-shaped. For information, in the figure, tire constituent members such as a carcass, a belt layer, a bead core, a bead filler, and the like which are usually used are not illustrated and a dotted line shows a shape of bead portions 1.

FIG. 1(*b*) shows a conventional tire provided with rim protectors 13 at bead portions 11 and height from a lateral side 11*a* outwardly in the tire radius direction of a bead portion 11 is shown as H. Further, in the present invention, a lateral side 3*a* outwardly in the tire radius direction of rim protectors 3 is provided with protrusions 4. As a result, when H which is height of protrusions 4 from a lateral side 1*a* outwardly in the tire radius direction of bead portions 1 is set to be the same as the height of a conventional tire, rubber volume can be reduced in rim protectors as a whole. In other words, rubber volume can be reduced by what is shown in a hatched portion of FIG. 1(*b*). Therefore, heating of bead portions 1 and rim protectors 3 is reduced and durability of bead portions 1 is improved.

As shown in FIG. 1(*c*), rim protectors 3 can also be made to be trapezoidal cross-section. It is preferable that the width W of the top face 3*b* of the trapezoid is not greater than 5 mm. When the width exceeds 5 mm, there is little reduced rubber volume and the effect of improving durability of bead portions gets small.

In addition, although it depends on a loaded rim shape, from the view point of obtaining satisfactory protection performance of a rim, it is preferable that H which is the height of protrusion 4*s* from a lateral side 11 *a* outwardly in the tire radius direction of bead portions 11 is not less than 11 mm. Further, from the view point of reducing rubber volume, it is preferable that H1 which is the height of protrusions 4 from the outermost point P of rim protectors 3 is not less than 1 mm.

Further, the heat generated at bead portions 1 and rim protectors 3 during driving is transmitted to protrusions 4, thereby radiating heat. As a result, heating at bead portions 1 is suppressed, thereby capable of improving durability of bead portions 1. It is preferable that the surface areas of protruded portions of protrusions 4 are 50 mm².

Next, protective function of a rim will be explained. When a tire lateral surface approaches a curbstone and when a protrusions 4 get contact with a curbstone first, the protrusions 4 inhibit rim protectors 3 from getting contact with a curb-stone, thereby preventing deformation of the rim protectors 3. In addition, even when the rim protectors firstly get contact with a curbstone, since a rotating tire gets contact with a curb-stone, the protrusions 4 get contact with a curb stone and likewise, deformation of rim protectors 3 can be prevented. Therefore, in any case, the protrusions 4 prevent the rim protectors 3 from being deformed, thereby protecting a rim.

As shown in FIG. 1(*d*), it is preferable that a plurality of protrusions 4 are arranged on rim protectors 3. It is preferable that intervals D on a virtual circumference C on which protrusions 4 are arranged are not greater than 160 mm. When the intervals D exceed 160 mm, it frequently occurs that not the protrusions 4 but rim protectors 3 alone get contact with a curbstone, thereby degrading rim protection performance.

Shapes of protrusions 4 are not specifically limited. For example, shapes may include any of columnar shapes, conical shapes, and semi-spherical shapes. Shapes of bases of protrusions 4 may include any of circular shapes, elliptical shapes, and polygonal shapes. However, from the view point of protecting a rim, shapes of protrusions are preferably columnar such as cylindrical, prismatic, and the like. For information, although it can be another way of the embodiment to drive protrusions made of metals or synthetic resins in rim protectors, it may cause an increase in tire weight, it may cause cracks from driven portions, or already driven protrusions may come off. Therefore, it is preferable that protrusions 4 are integrally molded by a mold at the time of vulcanizing a tire.

In addition, when a tread pattern has an asymmetric pattern with tire rotational directions designated, rim protectors and protrusions may be provided on one bead portion alone which is in the outer side of a vehicle. For other cases, it is preferable that rim protectors and protrusions are provided on bead portions on both sides. Further, such rim protectors and protrusions are particularly effective for a tire whose cross-sectional height is low with flatness ratio of not greater than 55%.

EXAMPLE

As to Examples 1 to 5 of the pneumatic tires related to the present invention, tires provided with rim protectors and protrusions as shown in FIG. 1(*a*) were manufactured and tires provided with rim protectors as shown in FIG. 1(*b*) but provided with no protrusions were manufactured, respectively. In addition, surface areas of protrusions 4 and the intervals are as shown in FIG. 1 and every tire size is 305/40R22, with air pressure of 250 kPa.

(Rim Protection Performance)

Tires were loaded on a 4-wheel-drive of 4000 cc engine, and the degree of damage of a rim was visually observed and confirmed when tires were made to get contact with a curbstone with an intrusion speed of 5 km/h and with an intrusion angle of 5° and was driven by 5 m parallel to the curbstone.

(Bead Portion Durability)

A drum testing was conducted based on JIS D4230 and the driving distance was measured until failure at bead portions was visually observed. Any result is shown in Table 1 making the value of the Comparative Example 100 as an index and the smaller number shows the better performance.

TABLE 1

|  |  | Example 1 | Example 2 | Example 3 | Example 4 | Example 5 | Comparative Example |
|---|---|---|---|---|---|---|---|
| Protrusions | Surface area (mm²) | 50 | 110 | 50 | 50 | 30 | — |
|  | Interval D (mm) | 160 | 60 | 30 | 245 | 160 | — |
|  | H (mm), height from a lateral side of bead portions | 18 | 18 | 18 | 18 | 18 | 18 |
|  | H1 (mm), height from rim protectors | 1.5 | 1.5 | 1.5 | 1.5 | 1.5 | — |
| Rim protection property |  | 97 | 99 | 100 | 80 | 92 | 100 |
| Durability of bead portions |  | 165 | 135 | 105 | 180 | 170 | 100 |

According to Table 1, since rubber volume could be reduced, in any Example, durability at bead portions could be improved. Further, in Examples 1 to 3 in which protrusion intervals are set to be not greater than 160 mm, rim protection performance could be maintained.

What is claimed is:

1. A pneumatic tire provided with a tread with a crown shape, a pair of bead portions, and a pair of side walls connecting said tread and said bead portions, wherein rim protectors protruded outwardly in the tire rotating axial direction from said bead portions are provided at least either one of said pair of bead portions, and a plurality of protrusions are provided on a lateral side outwardly in the tire radius direction of said rim protectors and intervals of adjacent said protrusions are at least 30 mm and not greater than 160 mm.

2. The pneumatic, tire as set forth in claim 1, wherein surface areas of said protrusions are not less than 50 mm$^2$.

3. The pneumatic tire as set forth in claim 1, wherein height of said protrusions from a lateral side outwardly in the tire axial direction of bead portions is not less than 11 mm, and height of said protrusions from said rim protectors is not less than 1 mm.

4. A pneumatic tire provided with a tread with a crown shape, a pair of bead portions and a pair of sidewalls connecting said tread and said bead portions, wherein rim protectors protrude outward in the tire rotating axial direction from said bead portions, said rim protectors comprising a smooth surface without having a concave portion, a plurality of protrusions are provided on a lateral side outwardly in the tire radius direction of said rim protectors, and said protrusions extend further outward in the tire rotating axial direction than said rim protector.

* * * * *